(12) United States Patent
Flood

(10) Patent No.: US 11,022,962 B2
(45) Date of Patent: Jun. 1, 2021

(54) HIGH AVAILABILITY INDUSTRIAL AUTOMATION SYSTEM HAVING PRIMARY AND SECONDARY INDUSTRIAL AUTOMATION CONTROLLERS AND METHOD OF COMMUNICATING INFORMATION OVER THE SAME

(71) Applicant: Rockwell Automation Technologies, Inc., Mayfield Heights, OH (US)

(72) Inventor: Mark A. Flood, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 172 days.

(21) Appl. No.: 16/145,697

(22) Filed: Sep. 28, 2018

(65) Prior Publication Data

US 2020/0103861 A1    Apr. 2, 2020

(51) Int. Cl.
| | | |
|---|---|---|
| *G05B 19/418* | (2006.01) | |
| *G06F 9/52* | (2006.01) | |
| *G06F 13/42* | (2006.01) | |

(52) U.S. Cl.
CPC ..... *G05B 19/4184* (2013.01); *G05B 19/4185* (2013.01); *G06F 9/52* (2013.01); *G06F 13/423* (2013.01); *G05B 2219/1208* (2013.01); *G05B 2219/1211* (2013.01)

(58) Field of Classification Search
CPC ... G05B 19/4184; G05B 19/4185; G06F 9/52; G06F 13/423
See application file for complete search history.

(56) References Cited

U.S. PATENT DOCUMENTS

| | | | | |
|---|---|---|---|---|
| 5,997,166 A | * | 12/1999 | Flood | G05B 9/03 |
| | | | | 700/2 |
| 2007/0168058 A1 | * | 7/2007 | Kephart | G06F 11/2028 |
| | | | | 700/82 |
| 2009/0125122 A1 | | 5/2009 | Cook et al. | |

FOREIGN PATENT DOCUMENTS

EP    1517203 A2    3/2005

OTHER PUBLICATIONS

Extended European Search Report dated Feb. 13, 2020; Application No. 19199157.9—(11) pages.

* cited by examiner

*Primary Examiner* — Yuhui R Pan
(74) *Attorney, Agent, or Firm* — Boyle Fredrickson, SC

(57) ABSTRACT

A high availability industrial automation system in disclosed. The system has a primary industrial automation controller, a secondary industrial automation controller, and a communication network connected to the primary industrial automation controller and the secondary industrial automation controller. The primary industrial automation controller includes a processor and a memory configured to store a plurality of instructions, a plurality of automation tasks, input/output (I/O) data, and internal storage data. The processor is operative to execute the plurality of instructions to cross load information from the primary industrial automation controller to the secondary industrial automation controller. The cross loading of information can be less than the maximum amount of communicable information capable of being cross loaded. Also disclosed are methods of communicating over the high availability industrial automation system.

17 Claims, 4 Drawing Sheets

HIGH AVAILABILITY INDUSTRIAL AUTOMATION SYSTEM HAVING PRIMARY AND SECONDARY INDUSTRIAL AUTOMATION CONTROLLERS AND METHOD OF COMMUNICATING INFORMATION OVER THE SAME

BACKGROUND INFORMATION

The subject matter disclosed herein relates to industrial automation systems. More specifically, the subject matter disclosed herein relates to industrial automation systems having backup capabilities.

As is known to those skilled in the art, industrial controllers are specialized electronic computer systems used for the control of industrial processes or machinery. An example industrial controller is programmable logic controllers (PLC's) used in a factory environment. Industrial controllers differ from conventional computers in a number of ways. Physically, they are constructed to be substantially more robust against shock and damage and to better resist external contaminants and extreme environmental conditions. The processors and operating systems of industrial controllers allow for real-time control and execute languages for ready customization of programs to comport with a variety of different controller applications. Industrial controllers may have a user interface for accessing, controlling, and monitoring the industrial controller.

In a high availability (HA) industrial control system, it may not be enough for an industrial controller to maintain control after a single fault occurs. The user often needs to change the system operations when the HA state has changed. This may include doing a controlled shutdown or going to some other form of functionality, It is known for certain HA industrial control systems to include a data cross loading system for use with an industrial control system having a primary industrial controller and a secondary (or "backup") industrial controller. Each industrial controller has redundant hardware components and have data structures associated with these components. Further, known HA industrial control systems have a dedicated high speed data link that connects the primary industrial controller with the secondary industrial controller. The high-speed data link allows for a rapid and "bumpless" transfer of control from the primary industrial controller to the secondary industrial controller when a malfunction occurs. The high-speed data link rapidly cross loads data structures from the primary industrial controller to the secondary industrial controller. U.S. Pat. No. 5,777,874, the content of which is incorporated herein by reference, provides an example of a bumpless system having a dedicated high-speed data link between the primary industrial controller and the secondary industrial controller.

However, such bumpless systems have not been fully met without incurring various disadvantages. A fully synchronized HA industrial control system, such as disclosed in U.S. Pat. No. 5,777,874, requires a large amount of data to be transferred between the two controllers. This leads to the requirement for the dedicated high speed link between the devices, additional component costs, additional processing power, and greater board real-estate.

BRIEF DESCRIPTION

An HA industrial control system with less functionality than known HA industrial control systems is desired. Applications exist where full synchronization and high speed performance are not required by the HA industrial control system. Accordingly, embodiments of the invention provide an HA industrial control system without requiring a dedicated high speed link. The removal of the dedicated high-speed data link and related modules help to lower cost of the improved HA system. Additionally and alternatively, embodiments of the invention provide an HA industrial control system with limited program and data synchronization as options. The lower levels of synchronization allow the user to configure HA features to tradeoff features versus performance. Embodiments of the invention allow the user to configure a system which will provide an acceptable level of continuation of control without program or data synchronization.

In one embodiment, the invention provides a method of communicating information from a first industrial automation controller to a second industrial automation controller of a high availability network. The method includes receiving a signal indicative to cross load less than full synchronization between the first industrial automation controller and the second industrial automation controller, limiting synchronization between the first industrial automation controller and the second industrial automation controller based on the received signal, and cross loading information from the first industrial automation controller to the second industrial automation controller. The cross loading of information is less than the maximum amount of communicable information capable of being cross loaded.

In another embodiment, the invention provides a high availability industrial automation system having a primary industrial automation controller, a secondary (or backup) industrial automation controller, and a communication network connected to the primary industrial automation controller and the secondary industrial automation controller. The primary industrial automation controller includes a processor and a non-transitory storage medium configured to store a plurality of instructions, a plurality of automation tasks, input/output (I/O) data and internal storage data. The processor is operative to execute the plurality of instructions to receive a signal indicative to cross load less than full synchronization between the primary industrial automation controller and the secondary industrial automation controller, limit synchronization between the primary industrial automation controller and the secondary industrial automation controller based on the received signal, and cross load information from the primary industrial automation controller to the secondary industrial automation controller. The cross loading of information is less than the maximum amount of communicable information capable of being cross loaded.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings, in which.

DETAILED DESCRIPTION

Figure 1:
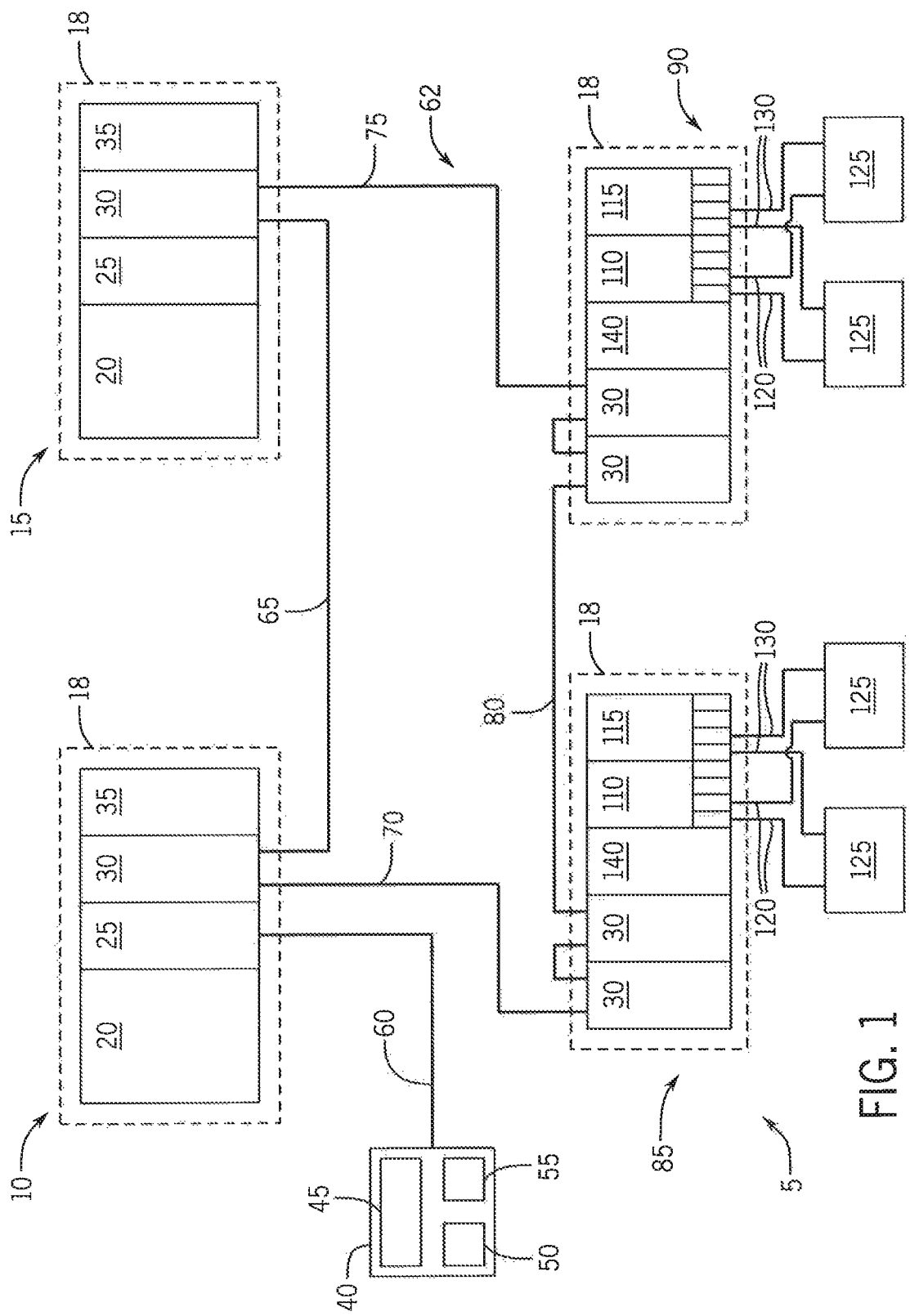
FIG. 1 is a block diagram representing a high availability industrial automation system according to one embodiment of the invention.

In describing the various embodiments of the invention, which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

With reference to FIG. 1, an industrial automation system 5 includes a first (or primary) industrial automation controller 10 and a second (or secondary) industrial automation controller 15. As illustrated, the first and second industrial automation controllers 10 and 15 are modular and may be made up of numerous different modules connected together on a rack or rail (represented by dashed line 18). Additional modules may be added or existing modules removed and the first and second industrial automation controllers 10 and 15 reconfigured to accommodate the new configuration. In the exemplary industrial automation system 5 shown, both the first and second industrial automation controllers 10 and 15 include a power supply module 20, a controller module 25, and a network module 30. Each industrial automation controller 10 and 15 is further shown with an additional module 35 that may be selected according to the controller requirements. An example additional module is an analog or digital input or output module, which will be referred to herein generally as an I/O module. Another example additional module is a redundancy module for maintaining redundant information between the first industrial automation controller 10 and the second industrial automation controller 15. Other exemplary additional modules include an additional controller module or an additional network module, An operator interface 40 is shown connected to the industrial automation system 5. The operator interface 40 can include a processing portion 45, an input device 50, and an output device 55. The input device 50 can include, but not limited to, a keyboard, touchpad, mouse, trackball, or touch screen. The output device 55 can include, but not limited to, a display, speaker, or printer. It is contemplated that each component of the operator interface 40 may be incorporated into a single unit, such as an industrial computer, laptop, or tablet computer. It is further contemplated that multiple operator interfaces can be distributed about the industrial automation system 5. The operator interface 40 may be used to display operating parameters and/or conditions of the controlled machine or process, receive commands from the operator, or change and/or load a control program or configuration parameters. An interface cable 60 connects the operator interface 40 to the first industrial automation controller 10.

The first and second industrial automation controllers 10 and 15 are connected to other devices by a network 62 according to the application requirements. An interface cable 65 connects the network modules 30 of the controllers 10 and 15. An interface cable 70 connects the first industrial controller to a first remote rack 85. An interface cable 75 connects the second industrial controller to a second remote rack 90. An interface cable 80 connects the first remote rack 85 to the second remote rack 90. It is contemplated that the network cables 65-80 may be custom cables configured to communicate via a proprietary interface or may be a standard industrial cable for a non-proprietary network. Example non-proprietary networks include Ethernet/IP, DeviceNet, or ControlNet. The network cables 65-80 arrange the controllers and racks of the network 62 in what is referred to as a ring arrangement. It is contemplated that other network arrangements are possible for coupling the elements of the network 62, including arrangements that have switches that allow for redundancy communication paths, daisy-chain arrangements, star (simple or multi-layered) arrangements, or more complicated topologies such as redundant local area networks (LANs). The network modules 30 are configured to communicate according to the protocol of the network to which it is connected and may be further configured to translate messages between two different network protocols.

The first and second remote racks 85 and 90 are positioned at varying positions about the controlled automation system or process. As illustrated, each remote rack 85 and 90 is modular and may include numerous different modules connected together in a rack or mounted to a rail. Additional modules may be added or existing modules removed (e.g., one of the redundant network modules 30) and the remote rack 85 or 90 reconfigured to accommodate the new configuration.

As illustrated, each remote rack 85 and 90 includes a pair of network modules 30. Each network module 30 is connected to one of the network cables 70-80, an input module 110, and an output module 115. Each pair of network modules 30 allows for network redundancy at the respective remote rack 85 or 90. Each of the input modules 110 is configured to receive input signals 120 from controlled devices 125. Each of the output modules 115 is configured to provide output signals 130 to the controlled devices 125. An input module and an output module may be combined into a singular module, and collectively the input and output modules may be referred to as I/O modules. Optionally, still other modules 140 may be included in the remote rack 85. It is understood that the industrial automation system 5, the industrial automation controllers 10 and 15, and the remote racks 85 and 90 may take numerous other forms and configurations without deviating from the scope of the invention.

Figure 2:
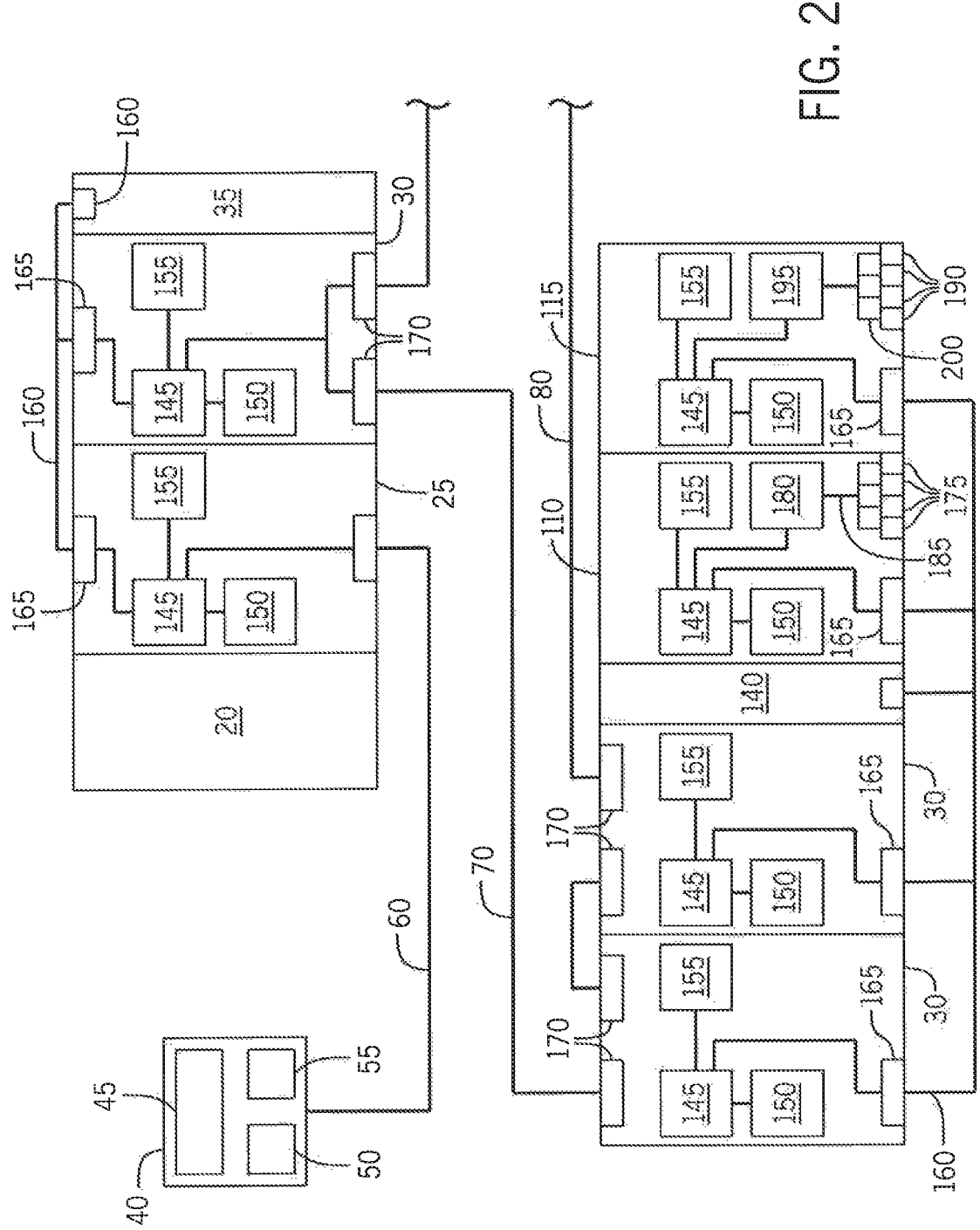
FIG. 2 is a block diagram representing some aspects of the exemplary industrial automation system of FIG. 1 in greater detail.
Figure 3:
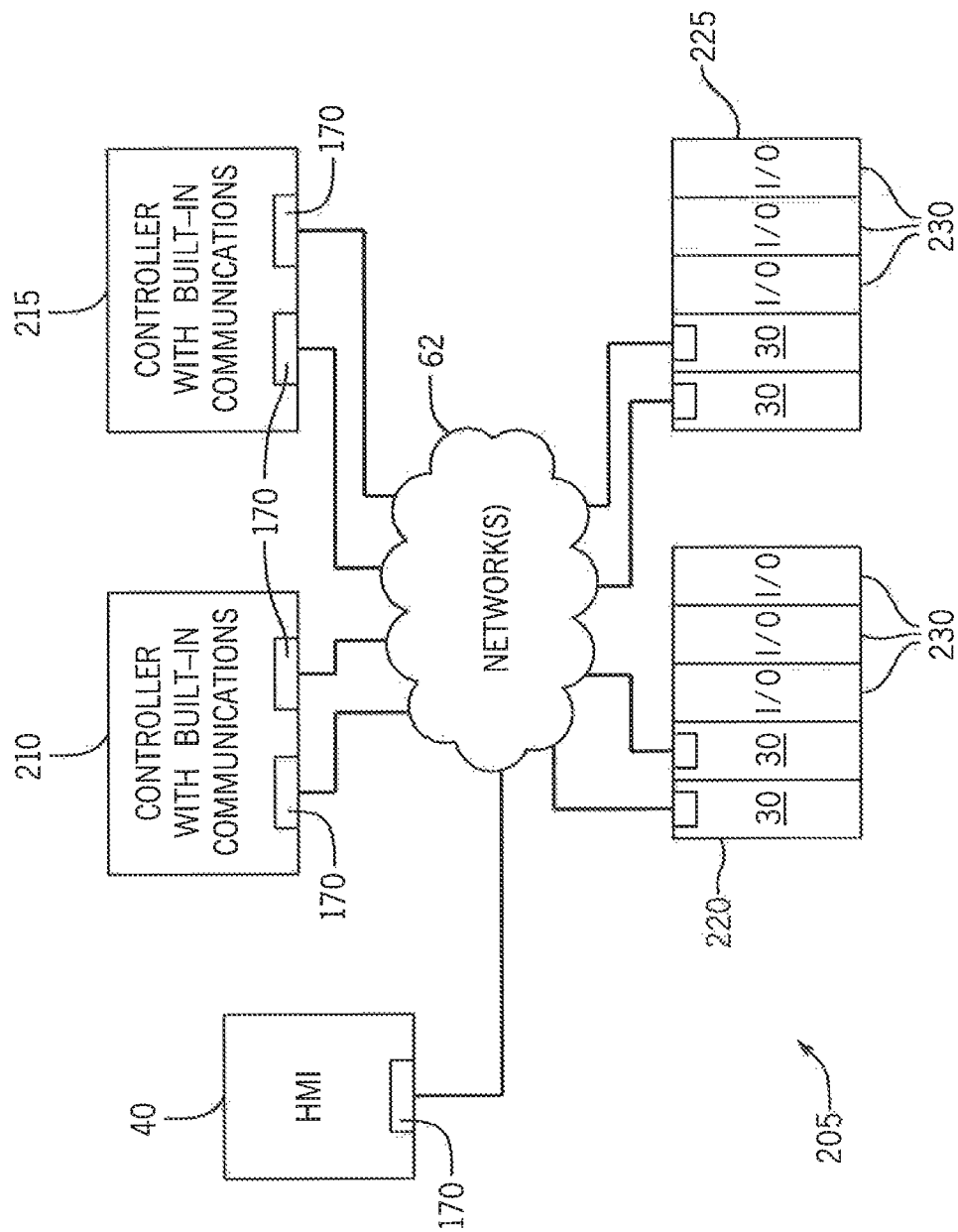
FIG. 3 is a block diagram representing a high availability industrial automation system according to another embodiment of the invention.

Referring next to FIG. 2, a portion of the exemplary industrial automation system of FIG. 1 is illustrated in block diagram form. It is contemplated that each of the nodes in the network may include a processor 145 and a memory 150. The processors 145 are configured to execute instructions and to access or store operating data and/or configuration parameters stored in the corresponding memory 150. The processors 145 are suitable processors according to the node requirements. It is contemplated that the processors 145 may include a single processing device or multiple processing devices executing in parallel and may be implemented in separate electronic devices or incorporated on a single electronic device, such as a field programmable gate array (FPGA) or application specific integrated circuit (ASIC). The memory devices 150 are non-transitory storage mediums that may be a single device, multiple devices, or may be incorporated in part or in whole within the FPGA or ASIC. Each of the nodes also includes a clock circuit 155, and each clock circuit 155 is preferably synchronized with the other clock circuits 155 according to, for example, the IEEE-1588 clock synchronization standard. Each clock circuit 155 generates a time signal configurable to report the present time accurate to either microseconds or nanoseconds. Communication between nodes mounted in the same rack or contained within a single housing occurs via a backplane 160 and a corresponding backplane connector 165. Nodes communicating via network media 65-80 include ports 170 configured to process the corresponding network protocol. The input module 110 includes input terminals 175 configured to receive the input signals 120 (FIG. 1) from the controlled devices 125, 135. The input module 110 also includes any associated logic circuitry 180 and internal connections 185 required to process and transfer the input signals 120 from the input terminals 175 to the processor 145. Similarly, each output module 115 includes output terminals 190 configured to transmit the output signals 130 (FIG. 1) to the controlled devices 125,135 (FIG. 1). The output module 115 also includes any associated logic circuitry 195 and internal connections 200 required to process and transfer the output signals 130 from the processor 145 to the output terminals 190, FIG. 3 shows another exemplary automation system 205 including a first (or primary) industrial automation controller 210 and a second (or secondary) industrial automation controller 215. The first and second industrial automation controllers 210 and 215 are not shown in FIG. 3 as being multi-modular (as compared to the controllers 10 and 15 of FIG. 1), but are unitary industrial automation controllers with power supplies and communications built within the controllers. Further, the first and second remote racks 220 and 225 are shown with the Input/Output (I/O) modules 230 as being unitary modules, unlike the distributed I/O modules 110 and 115 shown in FIG. 1.

Figure 4:
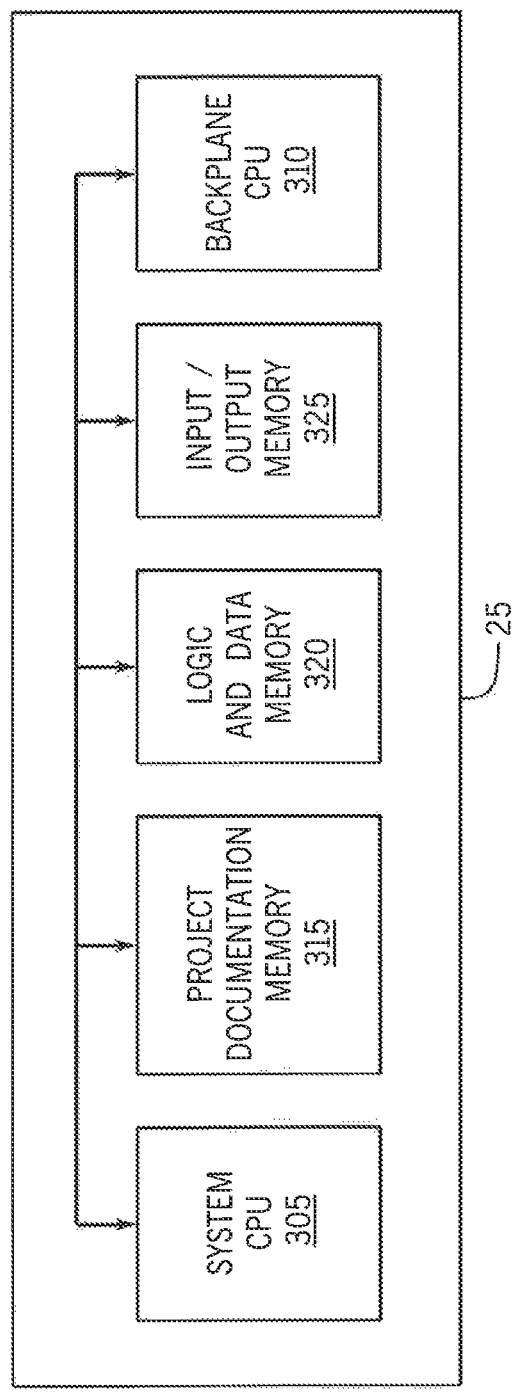
FIG. 4 is a block diagram representing a processor and memory arrangement for one embodiment of a system controller of an industrial automation controller.

FIG. 4 is a block diagram showing one example arrangement for the processor 145 and memory 150 of a controller module 25. In FIG. 4, the processor 145 includes multiple computer processing units. The first computer processing unit (CPU) 305 is a system CPU that executes application code and messages for communication with other components of the industrial automation system 5. The second CPU 310 is a backplane CPU that transfers I/O data and other module data on a backplane. The two CPUs 305 and 310 operate independently from each other. The memory is shown as having multiple memories. The memories include a project documentation memory 315, logic and data memory 320, and I/O memory 325. The project documentation memory 315 can include memory for comment descriptions, alarm logs, and data properties. The logic and data memory 315 includes memory for program source code, and program data. The I/O memory can include I/O data, message buffers, and similar data. The three memories can similarly operate independently of each other, i.e., the processors can access information from distinct memories at the same time. While one arrangement for a processor 145 and memory 150 is shown in FIG. 4, it is contemplated that other arrangements and number of processors and/or memory can be different.

Prior HA industrial automation systems include a data cross loading system having a high-speed data link for allowing rapid and bumpless transfer of control from the primary industrial automation controller to the secondary industrial automation controller when a malfunction occurs. However, such bumpless systems have not been fully met without incurring, various disadvantages as already discussed above.

For some applications, full synchronization and high speed performance are not required. The industrial automation system 5, for example, does not utilize a dedicated high speed data link. The removal of the dedicated high speed link and related modules help to lower the cost of the improved industrial automation system 5. The industrial automation system 5 also utilizes lower levels of synchronization by allowing the user to configure the industrial automation system 5. Configuring the industrial automation system 5 allows for trading features with performance.

During configuration of the industrial automation system 5, the user can provide configuration input via the operator interface 40. For example, the user may identify to the industrial automation controller 10 that it is the primary controller and that the industrial automation controller 15 is the secondary (or backup) controller. The user may also identify other components coupled to the industrial automations system 5 to the primary industrial automation controller 10. Further configuring and programming of the industrial automation system 5 can be done as is customary to one skilled in the art.

During operation of the industrial automation system 5, the primary industrial automation controller 10 controls the first and second remote racks 85 and 90 and cross loads information to the secondary industrial automation controller 15. The controlling of the industrial automation system 5 and cross loading of information is accomplished over network 62.

More related to embodiments of the invention is the further configuring of the primary industrial automation controller 10, via the operator interface 40, to cross load less than full synchronization information between the primary industrial automation controller 10 and the secondary industrial automation controller 15. For example, the user can enter a command to the primary industrial automation controller 10 to (a) cross load program synchronization information and input/output (I/O) synchronization information, (b) cross load program synchronization information and not I/O synchronization information, (c) cross load I/O synchronization information and not program synchronization information, and (d) cross load neither I/O synchronization information nor program synchronization information.

It is envisioned that other information may be cross loaded or prevented from cross loading between the primary and second industrial automation controllers 10 and 15. An example of program synchronization information includes industrial automation tasks (e.g., event tasks, periodic tasks, continuous tasks) to be used by the first remote rack 85 and/or the second remote rack 90. An example of I/O synchronization information includes I/O data acquired from the devices 125 during operation of one or more industrial automation tasks.

Through the selection of synchronization options, the improved industrial automation system 5 allows for trading features with performance. With option (a), above, the industrial automation system 5 still allows for full synchronization, but the synchronization may be delayed by data congestion on the network 62. This may create a "bump" in the industrial automation system 5 when the secondary industrial automation controller 15 takes over from the primary industrial automation controller 10 since the cross loading of information may not be fully synchronized. Presumably the bump will be acceptable otherwise a user may select a different industrial automation system with a dedicated synchronization connection. Also this option is selected for the expectation that the network 62 has little data congestion among the various components to allow for the full synchronization to occur.

When data congestion is higher than what is acceptable for option (a), the user may select options (b) or (c), above. Options (b) and (c) still allow for some synchronization among the industrial automation controllers 10 and 15 to improve performance over a non-synchronized system; but the reduced synchronization improves data congestion on the network 62 since less than full synchronization occurs.

For implementations when I/O synchronization information is not cross loaded (i.e., option (b)), a bump in the industrial automation system 5 occurs when the secondary industrial automation controller 15 takes over from the primary industrial automation controller 10. The bump occurs since the default I/O synchronization information is not as current as the I/O synchronization information of the primary industrial automation controller 10. However, the user has deemed the bump to be acceptable.

For implementations when program synchronization information is not cross loaded (i.e., option (c)), the secondary industrial automation controller 15 may include a program, such as a shutdown program, that is acceptable to the user when the secondary industrial automation controller 15 takes over from the primary industrial automation controller 10. The cross loading of I/O synchronization information is deemed by the user as necessary in option (c) to allow the secondary industrial automation controller to function.

Lastly, the user may configure the primary industrial automation controller with option (d), above. It is not envisioned that this feature will be selected often since no cross loading will take place between the industrial automation controllers 10 and 15. However, it is conceivable that the network 62 may become too congested such that no cross loading may be desired.

With using the configurable levels of cross loading, embodiments of the invention can also allow for a similar look and feel to the full implementation of the system described in U.S. Pat. No. 5,777,874, but with reduced functionality. This will allow a manufacturer to provide a family of customizable products to the consumer.

According to another aspect of the invention, the control program loaded into each of the primary controller 10 and the secondary controller 15 includes a verification tag associated with the program. The verification tag may be generated by programming software when the control program is created prior to loading the program into the controller. Optionally, the verification tag may be generated by the primary controller when a new control program is loaded into the controller. It is further contemplated that the verification tag may be modified if, for example, a technician modifies the control program, or a portion thereof, within the controller after it has already been downloaded.

The verification tag maybe generated by any suitable method. It is contemplated that the verification tag may be, for example, a single number or a data string, such as a checksum, generated as a function of the content of the control program; a user defined name assigned to the control program, where the name must be unique for each program; a value generated based on the time the control program is created; an incremental value that is automatically updated by the programming software each time the control program is changed; or any combination thereof. The verification tag is stored in the memory of the primary controller 10.

As indicated above, it is contemplated that the user may configure whether the program is synchronized between the primary and secondary controllers 10, 15 as an option of the HA system. When the synchronization occurs, the primary controller 10 transfers the verification tag associated with the control program along with the control program to the secondary controller 15. If program synchronization is not selected, a separate verification tag is loaded into each controller when the corresponding control program is loaded into the controller. Similarly, should the control program be modified on either the primary or secondary controller 10, 15, the verification tag changes on the controller to which modifications are made. The verification tag for each controller 10, 15 is transmitted to the other controller even if the program synchronization is not selected. Because the verification tag is a single number or string of data, it does not require significant bandwidth for transmission.

As previously discussed, the HA system typically needs to continue operation under various fault conditions. One such fault condition is the failure of a controller. If the controller presently controlling operation of the industrial automation system 5 (i.e., either the primary controller 10 or the secondary controller 15) enters a fault state such that the controller no longer can continue operating, the HA system may execute a switchover such that the other controller continues operation of the system. Because it is possible that the two control programs are not identical (i.e., program synchronization was not selected) the controller is configured to compare the verification tag fir the control program presently loaded in the controller that is to begin operating to the verification tag of the controller previously operating. If the two verification tags are identical, the switchover is allowed to proceed and the secondary controller continues operation of the HA system.

If the two verification tags are not identical, the two control programs in each controller were not identical. An error message is generated and transmitted to a technician to identify the fault condition. Further operation may proceed according to a predefined state. In one state, the new controller may immediately shut down due to the differences in the program. In another state, the new controller may enter a controlled shut down state, to allow the controlled system to continue operating for a period of time. In still another state, the new controller may be allowed to take over operation of the controlled process with the different control program but simply post a message alerting the operator of the condition such that the operator may take action according to the application requirements.

Variations and modifications of the foregoing are within the scope of the invention. It also being understood that the invention disclosed and defined herein extends to all alternative combinations of two or more of the individual features mentioned or evident from the text and/or drawings. All of these different combinations constitute various alternative aspects of the invention. The embodiments described herein explain the best modes known for practicing the invention and will enable others skilled in the art to utilize the invention. The invention is capable of other embodiments and of being practiced or carried out in various ways.

What is claimed is:

1. A method of communicating information from a first industrial automation controller to a second industrial automation controller of a high availability network, the method comprising:
receiving a signal indicative to cross load less than full synchronization between the first industrial automation controller and the second industrial automation controller;
limiting synchronization between the first industrial automation controller and the second industrial automation controller based on the received signal; and
cross loading information from the first industrial automation controller to the second industrial automation controller, the cross loading of information being less than the maximum amount but at least a portion of communicable information capable of being cross loaded, wherein receiving the signal indicative to cross load less than full synchronization includes receiving a signal indicative to not cross load I/O synchronization information,
wherein limiting the synchronization between the first industrial automation controller and the second industrial automation controller includes limiting I/O synchronization information between the first industrial automation controller and the second industrial automation controller, and
wherein cross loading the information from the first industrial automation controller to the second industrial automation controller includes cross loading program synchronization information from the first industrial automation controller to the second industrial automation controller.

2. The method of claim 1, wherein:
cross loading information from the first industrial automation controller to the second industrial automation controller is performed via an industrial network,
the industrial network is configured to transmit data between the first industrial automation controller and the second industrial automation controller,
the industrial network is configured to transmit data between the first industrial automation controller and at least one remote rack, where the second industrial automation controller is not present on the at least one remote rack, and
the cross loading of information being less than the maximum amount but at least a portion of communicable information capable of being cross loaded.

3. The method of claim 1, wherein the maximum amount of communicable information capable of being cross loaded includes program synchronization information and input/output (I/O) synchronization information.

4. The method of claim 3, wherein the program synchronization information includes industrial automation tasks.

5. The method of claim 3, wherein the I/O synchronization information includes I/O data to support industrial automation tasks.

6. The method of claim 2 further comprising the step of:
receiving data at the first industrial automation controller from at least one remote device via the industrial network.

7. A high availability industrial automation system, the system comprising:
a primary industrial automation controller including a first processor and a first non-transitory storage medium configured to store a first plurality of instructions, a first plurality of automation tasks, and first I/O data;
a secondary industrial automation controller including a second processor and a second non-transitory storage medium configured to store a second plurality of instructions, a second plurality of automation tasks, and second I/O data; and
a communication network connected to the primary industrial automation controller and the secondary industrial automation controller, wherein the first processor is operative to execute the first plurality of instructions to:
receive a signal indicative to cross load less than full synchronization between the primary industrial automation controller and the secondary industrial automation controller,
limit synchronization between the primary industrial automation controller and the secondary industrial automation controller based on the received signal, and
cross load information from the primary industrial automation controller to the secondary industrial automation controller, the cross loading of information being less than the maximum amount of communicable information capable of being cross loaded, and wherein:
receiving the signal indicative to cross load less than full synchronization includes the first processor being operative to execute the first plurality of instructions to receive a signal indicative to not cross load I/O synchronization information,
limiting the synchronization between the primary industrial automation controller and the secondary industrial automation controller includes the first processor being operative to execute the first plurality of instructions to limit I/O data between the primary industrial automation controller and the secondary industrial automation controller, and
cross loading the information from the primary industrial automation controller to the secondary industrial automation controller includes the first processor being operative to execute the first plurality of instructions to cross load automation tasks from the first industrial automation controller to the second industrial automation controller.

8. The high availability industrial automation system of claim 7, further comprising:
at least one remote rack, the at least one remote rack separate from the primary industrial automation controller and from the secondary industrial automation controller, wherein:
the communication network is further connected to the at least one remote rack, and
the first processor is further operative to
cross load information from the primary industrial automation controller to the secondary industrial automation controller via the communication network.

9. The high availability industrial automation system of claim 7, wherein the primary industrial automation controller further includes a first processor module and a first communication module mounted to a first rack having a first backplane to facilitate communication at the primary industrial automation controller, the first processor module including the first processor and the first non-transitory storage medium, and
wherein the secondary industrial automation controller further includes a second processor module and a second communication module mounted to a second rack having a second backplane to facilitate communication at the second industrial automation controller, the second processor module including the second processor and the second non-transitory storage medium, wherein the communication network is further connected to the primary industrial automation controller and the secondary industrial automation controller via the first communication module and the second communication module, respectively.

10. The high availability industrial automation system of claim 8, wherein:
the at least one remote rack includes a remote rack to control an input device and an output device,
the remote rack includes a third communication module mounted to a third rack having a third backplane to facilitate communication at the remote rack, and
the communication network is further connected to the remote rack via the third communication module.

11. The high availability industrial automation system of claim 7, wherein the maximum amount of communicable information capable of being cross loaded includes program synchronization information and I/O synchronization information.

12. The high availability industrial automation system of claim 11, wherein the program synchronization information includes industrial automation tasks, and wherein the I/O synchronization information includes I/O data to support the automation tasks.

13. A primary industrial automation controller connectable to a backup industrial automation controller via a communication network, the primary industrial automation controller comprising:
a processor module mounted on a rack having a backplane to facilitate communication at the industrial automation controller, the processor module including a processor and a non-transitory storage medium, the processor and the non-transitory storage medium configured to store a plurality of instructions, a plurality of automation tasks, and I/O data, the processor being operative to execute the plurality of instructions to
receive a signal indicative to cross load less than full synchronization between the primary industrial automation controller and the backup industrial automation controller,
limit synchronization between the primary industrial automation controller and the backup industrial automation controller based on the received signal, and
cross load information from the primary industrial automation controller to the backup industrial automation controller, the cross loading of information being less than the maximum amount of communicable information capable of being cross loaded; and
a first communication module mounted on the first rack, coupled to the first processor module and connectable to the first network, wherein:

receiving the signal indicative to cross load less than full synchronization includes the processor being operative to execute the plurality of instructions to receive a signal indicative to not cross load I/O synchronization information,
limiting the synchronization between the primary industrial automation controller and the backup industrial automation controller includes the processor being operative to execute the plurality of instructions to limit I/O data between the primary industrial automation controller and the backup industrial automation controller, and
cross loading the information from the primary industrial automation controller to the backup industrial automation controller includes the processor being operative to execute the plurality of instructions to cross load automation tasks from the primary industrial automation controller to the backup industrial automation controller.

14. The primary industrial automation controller of claim 13, further comprising:
a first communication module mounted on the rack, wherein:
the first communication module is in communication with the processor module via the backplane,
the first communication module is connectable to the communication network,
the first communication module is operative to communicate with the backup industrial automation controller and with at least one remote rack via the communication network, and
the remote rack does not include the backup industrial automation controller; and wherein the processor is further operative to execute the plurality of instructions to:
cross load information from the primary industrial automation controller to the backup industrial automation controller via the communication network.

15. The primary industrial automation controller of claim 13, wherein the maximum amount of communicable information capable of being cross loaded includes program synchronization information and input/output (I/O) synchronization information.

16. The primary industrial automation controller of claim 15, wherein the program synchronization information includes industrial automation tasks, and wherein the I/O synchronization information includes I/O data to support the automation tasks.

17. The primary industrial automation controller claim 14, wherein the first communication module is configured to receive data from at least one remote device via the communication network.

* * * * *